United States Patent [19]

Oda

[11] Patent Number: 4,960,159
[45] Date of Patent: Oct. 2, 1990

[54] ANTI-SKID DEVICE FOR TIRED VEHICLE WHEELS

[76] Inventor: Yutaka Oda, 8-17, Mihonosato, Takasago-shi, Hyogo-ken, Japan

[21] Appl. No.: 326,673

[22] Filed: Mar. 21, 1989

[30] Foreign Application Priority Data

May 28, 1988 [JP] Japan .................................. 63-130727
Sep. 5, 1988 [JP] Japan .................................. 63-116498

[51] Int. Cl.⁵ ........................ B60C 27/20; B60C 27/02
[52] U.S. Cl. ............................... 152/216; 152/213 A;
152/226; 301/41 R
[58] Field of Search ............... 152/213 R, 213 A, 225,
152/218, 217, 219, 216, 221, 222, 223, 224, 225
C, 226, 228, 241; 301/38 R, 40 R, 40 S, 41 R;
152/170, 172, 175, 176, 233

[56] References Cited

U.S. PATENT DOCUMENTS

| 4,378,040 | 3/1983 | Howell | 152/213 A |
|---|---|---|---|
| 4,405,006 | 9/1983 | Preusker | 152/216 |
| 4,576,214 | 3/1986 | Preusker | 152/230 |
| 4,588,010 | 5/1986 | Melzi et al. | 152/217 |
| 4,648,434 | 3/1987 | Melzi et al. | 152/217 |

Primary Examiner—Merrell C. Cashion, Jr.
Assistant Examiner—Gregory J. Wilber
Attorney, Agent, or Firm—Oliff & Berridge

[57] ABSTRACT

An anti-skid device for a vehicle wheel with a tire, particularly for tired vehicle wheels when used in ice and snow, arranged to be mounted on the vehicle wheel connected to an axle shaft, the anti-skid device including a setting member arranged to be positioned opposite to the vehicle wheel, the setting member including an annular setting portion concentric with the axle shaft, a supporting member removably mounted around the setting portion of the setting member, a fastening device for securing the supporting member to the setting portion of the setting member by fastening a pair of free ends of the supporting member to each other, such that the supporting member assumes a generally annular shape around the setting portion, the supporting member being fitted loosely around the setting portion unless the free ends of the supporting member are fastened to each other, and a plurality of elastically deformable anti-skid arms fixed to the supporting member, the arms extending radially outwardly over one of side walls of the tire and being angularly spaced apart from each other in a circumferential direction of the tire, each of the arms including a bent portion which is forcedly engaged with a tread surface of the tire when the supporting member is secured around the setting portion by the fastening device.

16 Claims, 8 Drawing Sheets

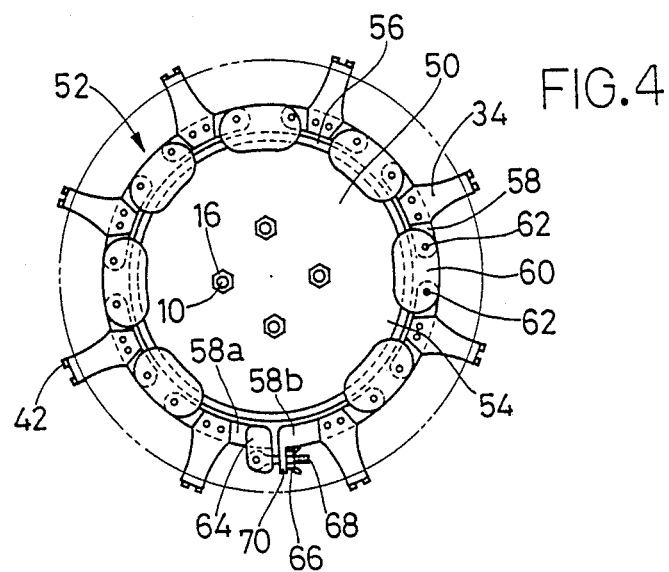
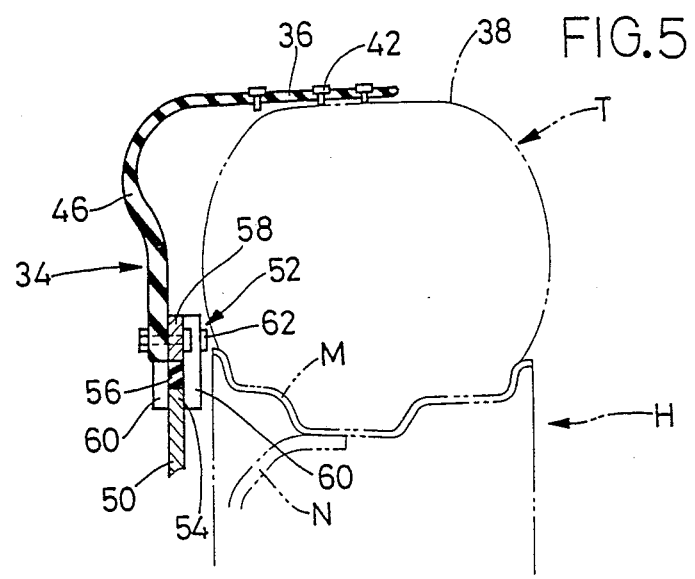

ANTI-SKID DEVICE FOR TIRED VEHICLE WHEELS

BACKGROUND OF THE INVENTION

1. Field of the Invention

The present invention relates to an anti-skid device for tired vehicle wheels and particularly to such anti-skid devices for use on tires when the tires are used on a snow-covered or frozen road.

2. Related Art Statement

Tire chains or snow chains are well known as one of anti-skid devices that are used on tires of an automotive vehicle so as to assure running stability of the vehicle when the vehicle is run on snow-covered road surfaces or frozen road surfaces. However, snow chains have a problem that it is time-consuming to mount and remove them on or from the tires. Furthermore, when used on normal or dry roads, snow chains wear the road surfaces on one hand while they are worn due to friction with the road surfaces on the other hand. Accordingly, drivers tend to hesitate about whether or not to use snow chains, except for such cases where it is likely that snow or ice road surface will continue a comparatively long distance.

In the above background, U.S. Pat. No. 4,576,214 to Preusker disclosed an anti-skid device which is more easily mounted on and removed from tired vehicle wheels so as to adapt the wheels to conditions of the road surface on which the vehicle is run.

The above anti-skid device includes (a) a setting disk secured to a vehicle wheel on which a tire is mounted; (b) a supporting disk removably secured to the setting disk; (c) a plurality of anti-skid arms extending radially outwardly from the supporting disk such that, with the supporting disk secured to the setting disk, bent-end portions of the anti-skid arms face a tread surface of the tire; (d) and a retaining ring for retaining the supporting disk to the setting disk by utilizing a bayonet-like locking mechanism so that the secured supporting disk will never come off the setting disk during running of the vehicle. In the anti-skid device, the retaining ring is rotated in one of opposite directions to secure the supporting disk to the setting disk and rotated in the other direction to remove the supporting disk from the setting disk.

The anti-skid arms of the above-indicated type anti-skid device are located in position on the tread surface of the tire by rotating the retaining ring in one direction relative to the setting disk fixed to the wheel rim so as to secure the supporting disk to the setting disk. On the other hand, the anti-skid arms are removed from the tread surface of the tire by first unlocking the bayonet-like locking between the retaining ring and the setting disk, and rotating the retaining ring in the other direction so as to remove the supporting disk from the setting disk. Accordingly, it is not required to jack up the vehicle body to mount the anti-skid device on, or remove the device from, the tire, or move the vehicle forward or backward. Thus, the prior art anti-skid device is more easily handled than conventional snow chains or tire chains.

However, the above anti-skid device suffers from problems of structural complexity and increased number of employed parts, because the supporting member is secured to the setting member by using the exclusive member, that is, retaining ring. Furthermore, an exclusive unlocking key is necessary for releasing the bayonet-like locking between the retaining ring and the setting disk.

Moreover, the prior art anti-skid device has a problem resulting from the fact that the diameter of a circle defined by the bent-end portions of the anti-skid arms is unchangeable. More specifically described, in the case where an anti-skid device whose anti-skid arms define a circle having a diameter greater than an outer diameter of the tire, is used for easier positioning of the anti-skid arms around the tire tread surface, an undesirable gap is provided between the bent-end portions of the anti-skid arms and the tire tread surface. Consequently, uncomfortable vibration is produced and transmitted to the vehicle body during running of the automotive vehicle. Moreover, due to that gap, the bent-end portions of the anti-skid arms are subjected to a comparatively high torsional stress during running of the vehicle, whereby the durability of the anti-skid arms is extremely deteriorated. Meanwhile, in the case where a circle defined by the bent-end portions of anti-skid arms is smaller than the outer diameter of the tire, another problem will occur that positioning of the bent-end portions of the anti-skid arms around the tire tread surface is difficult because of the unchangeable diameter of the circle defined by the bent-end portions of the anti-skid arms. It is further noted that uncomfortable vibration is also produced due to an undesirable gap which will grow little by little between the bent-end portions of the anti-skid arms and the tire tread surface as the tire is worn.

SUMMARY OF THE INVENTION

It is therefore an object of the present invention to provide an anti-skid device which has a simpler structure than prior art anti-skid devices and requires no aid member like the unlocking key of the anti-skid device disclosed by the previously-indicated U.S. Patent, and wherein anti-skid arms thereof are more easily located in position around, and removed from, tired vehicle wheels than prior art anti-skid devices.

It is another object of the invention to provide an anti-skid device wherein close contact between the bent-end portions of the anti-skid arms and the tire tread surface is well maintained during running of the automotive vehicle, even if the tire is worn little by little during its service life, whereby is prevented the generation of the uncomfortable vibration due to the gap otherwise produced between the bent-end portions of the arms and the tire tread surface.

The above objects have been achieved by the present invention, which provides an anti-skid device for a vehicle wheel with a tire, particularly for tired vehicle wheels when used in ice and snow, arranged to be mounted on the vehicle wheel connected to an axle shaft, the anti-skid device comprising (a) a setting member arranged to be positioned opposite to the vehicle wheel, the setting member including an annular setting portion concentric with the axle shaft, (b) a supporting member removably mounted around the annular setting portion of the setting member, (c) fastening means for securing the supporting member to the annular setting portion of the setting member by fastening a pair of free ends of the supporting member to each other, such that the supporting member assumes a generally annular configuration around the annular setting portion, the supporting member being fitted loosely around the annular setting portion unless the free ends of the supporting member are fastened to each other by the fastening means, and (d) a plurality of elastically deformable anti-skid arms fixed to the supporting member, the anti-skid arms extending radially outwardly over one of side walls of the tire and being angularly spaced apart from each other in a circumferential direction of the tire, each of the anti-skid arms including a bent portion which is forcedly engaged with a tread surface of the tire when the supporting member is secured around the annular setting portion by fastening the free ends of the supporting member to each other with the fastening means.

The setting member of the anti-skid device constructed as described above, may continue to be held on the vehicle wheel during all winter long or all year long, and the supporting member with the anti-skid arms may be mounted on the setting member only when the complete anti-skid device is needed. The supporting member is mounted around the annular setting portion of the setting member, such that first the supporting member whose free ends are apart from each other, is fitted loosely around the annular setting portion and subsequently the fastening device is placed in the fastened position thereof to tightly secure the supporting member to the setting member. Since a circle defined by the bent portions of the anti-skid arms assumes an enlarged diameter when the free ends of the supporting member are apart from each other as compared with when the free ends are fastened to each other, the anti-skid device may be adapted such that, when the free ends of the supporting member is not fastened to each other, the circle defined by the bent portions of the anti-skid arms has a diameter greater than an outer diameter of the tire. In such case, the anti-skid arms are easily located in position around the tread surface of the tire, even if tires to which the anti-skid device is applied are exchanged among those which have different outer diameters, so long as the differences in size fall within a certain range.

When the fastening means is placed in the fastened position after the supporting member is fitted loosely around the annular setting portion of the setting member, the supporting member is tightened so as to be secured to the annular setting portion. Concurrently the anti-skid arms are displaced toward the setting member, whereby the diameter of the circle defined by the bent portions of the anti-skid arms is reduced. Thus, the bent portions of the anti-skid arms are brought into forced engagement with the tread surface of the tire. More specifically described, because of elastic characteristic of the anti-skid arms, the bent portions of the anti-skid arms are securely engaged with the tire tread surface. Therefore, even if the tire is worn and consequently the outer diameter of the tire is reduced, the close contact between the anti-skid arms and the tire tread surface is well maintained, whereby no gap is produced between the bent portions of the anti-skid arms and the tread surface of the tire. Thus, the present anti-skid device is free from the problem of transmission to the vehicle body of the uncomfortable vibration resulting from such gap during running of the automotive vehicle, or the problem of deteriorated durability of the anti-skid arms resulting from the comparatively high torsional stress exerted thereto due to such gap.

In a preferred embodiment of the present invention, the anti-skid device further comprises an elastically deformable member disposed between the setting member and the supporting member, the supporting member being secured around the annular setting portion of the setting member via the elastically deformable member by fastening the free ends of the supporting member to each other with the fastening means.

In another embodiment of the anti-skid device of the invention, the supporting member comprises a deformable band-like body. It is preferred that the band-like body have a V groove of a generally V-shape cross section and that the annular setting portion of the setting member has a tapered cross section corresponding to the V groove of the band-like body, the band-like body being fastened around the annular setting portion by the fastening means, such that the tapered annular setting portion of the setting member is fitted in the V groove of the supporting member.

In yet another embodiment of the anti-skid device of the invention, the supporting member comprises a chain body including a plurality of link plates and a plurality of axis pins for pivotably connecting the link plates to each other.

In a further embodiment of the anti-skid device of the invention, the supporting member comprises a plurality of arcuate bodies and connecting means for pivotably connecting the arcuate bodies to each other, each of the arcuate bodies having a radius of curvature corresponding to a radius of the annular setting portion of the setting member.

According to a feature of the present invention, the anti-skid device further comprises a connecting member and joining means, the bent portions of the anti-skid arms extending transversely over the tread surface of the tire and facing at free ends thereof the other of the side walls of the tire, the free end of each of the bent portions being connected by the connecting member to the free end of each of the two bent portions on both sides of the each bent portion, the connecting member having a pair of free ends at a location between the free ends of a pair of adjacent bent portions of the bent portions, the pair of free ends of the connecting member being joined to each other by the joining means so that displacement of the free end of each of the bent portions is restricted.

According to another feature of the present invention, the anti-skid device further comprises an annular member fixed to the vehicle wheel such that the annular member is concentric with the axle shaft, the setting member having an annular groove of a generally arcuate cross section, the annular member having a generally circular cross section corresponding to the arcuate cross section of the annular groove of the setting member, at least one of the setting member and the annular member being formed of elastically deformable material, the setting member being secured to the vehicle wheel via the annular member such that the setting member is press fitted at the annular groove thereof in the annular member. It is preferred that the vehicle wheel includes a wheel rim on which the tire is mounted, that the wheel rim have an annular groove of a generally arcuate cross section corresponding to the circular cross section of the annular member, and that the annular member is fixed to the wheel rim by being press fitted in the annular groove of the wheel rim.

According to yet another feature of the invention, the vehicle wheel has an annular flanged portion concentric with the axle shaft, the supporting member being secured around the annular flanged portion, the annular flanged portion serving as the annular setting portion. It is preferred that the vehicle wheel includes a wheel rim on which the tire is mounted, and that the wheel rim have the annular flanged portion.

According to a further feature of the invention, the vehicle wheel includes a wheel rim on which the tire is mounted, and a wheel disk disposed between the wheel rim and the axle shaft, the setting member being secured to the wheel disk.

BRIEF DESCRIPTION OF THE DRAWINGS

The above and optional objects, features and advantages of the present invention will be better understood by reading the following detailed description of the presently preferred embodiments of the invention, when considered in conjunction with the accompanying drawings, in which:

FIG. 4 is an elevational view of another embodiment of the anti-skid device of the present invention;

FIG. 5 is a cross sectional view of a part of the anti-skid device of FIG. 4;

DETAILED DESCRIPTION OF THE PREFERRED EMBODIMENTS

Figure 1:
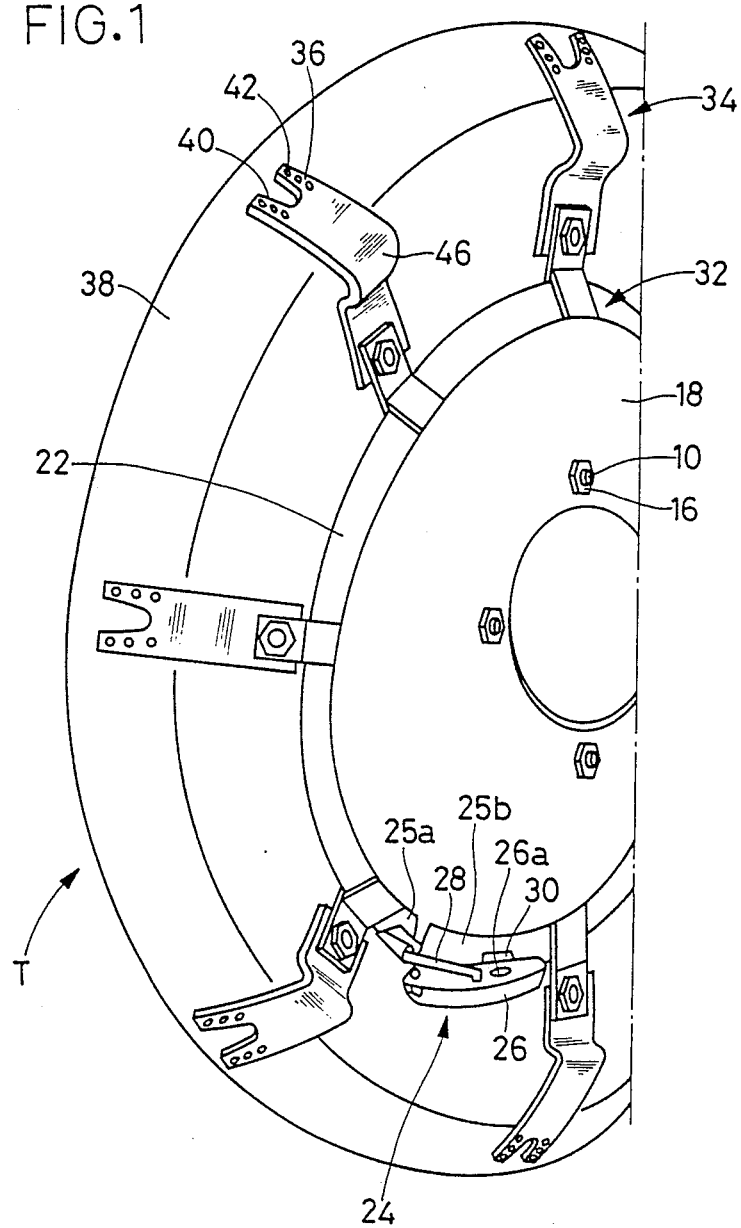
FIG. 1 is a partly cut away view illustrating an anti-skid device of the present invention which is mounted on a tired vehicle wheel.

Referring first to FIG. 1, there is shown an anti-skid device embodying the present invention. The anti-skid device is used for tired vehicle wheels of an automotive vehicle when the automotive vehicle is run on a frozen or a snow-covered road. The anti-skid device includes a setting member in the form of an annular plate 18 formed of a rigid material such as metal or resin.

Figure 2:
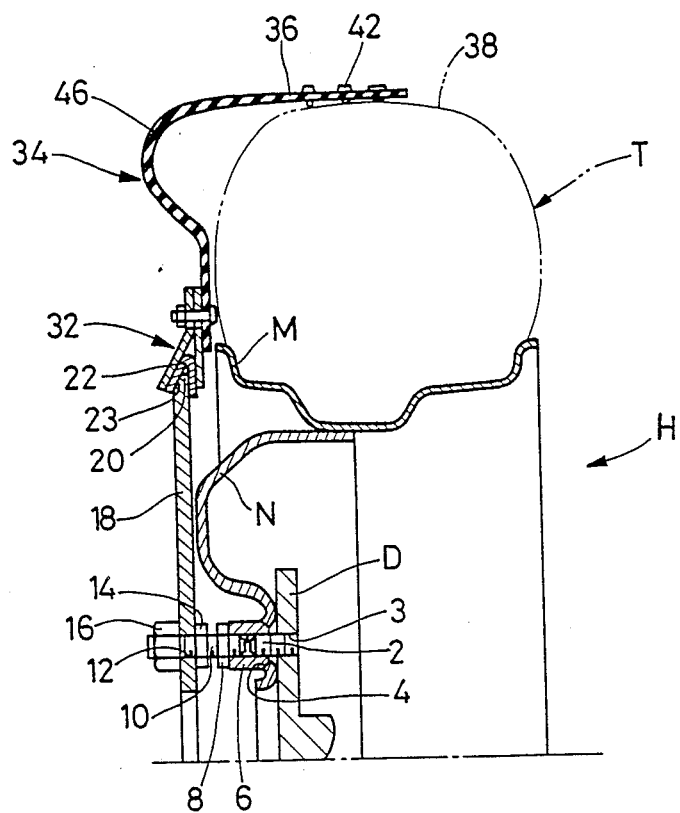
FIG. 2 is a vertical cross sectional view of the anti-skid device of FIG. 1.

As shown in FIG. 2, the annular plate 18 is fixed to a vehicle wheel H including a wheel rim M on which a pneumatic tire T is mounted, and a wheel disk N secured to an axle hub D. The axle hub D is connected to an axle shaft of the automotive vehicle. The annular plate 18 is fixed to an outer side surface of the vehicle wheel H, with various bolts and nuts 2, 6, 8, 10, 14, 16. The four bolts 2 are partially press fitted in corresponding holes 3 formed in the axle hub D, and each have an externally threaded portion which is not pressed fitted in the corresponding hole 3. The wheel disk N has four through-holes 4. The wheel H and the tire T are secured to the axle hub D, permitting the bolts 2 pressed fitted in the corresponding holes 3 of the axle hub D to extend through the corresponding through-holes 4 of the wheel disk N and each be engaged with a half portion of an internally threaded, long nut 6. The other half portion of each of the four long nuts 6 is used for thread engagement with an externally threaded, long bolt 10. The annular plate 18 has four through-holes 12, and is secured to the wheel disk N (and axle hub D), permitting the four long bolts 10 to extend through the corresponding through-holes 12 and each be engaged with the pair of nuts 14, 16. The four nuts 8 are engaged with the corresponding long bolts 10 such that the nuts 8 contact the corresponding long nuts 6. By adjusting an amount (or length) of engagement of the long bolts 10 with the long nuts 6 and/or a position of the engagement of the annular plate 18 with the long bolts 10, the instant anti-skid device is applied to various tires having different thicknesses (i.e. axial lengths).

The annular plate 18 has an outer diameter generally equal to that of the wheel rim M, and is secured to the wheel disk N such that the annular plate 18 is concentric with the axle hub D or the axle shaft of the automotive vehicle. After the annular plate 18 is secured to the wheel disk N, a supporting member in the form of a band body 22 is mounted around a peripheral annular portion 20 of the annular plate 18.

The band body 22 is formed of a long strip of metallic sheet such as stainless steel. For example, a metallic strip is bent along a longitudinal center line thereof so as to define a V groove 23 having a generally V-shape cross sectional profile, and subsequently is shaped to provide the band body 22 having a generally annular configuration in which the V groove 23 opens toward a center of the annular band body 22. The band body 22 has a circumferential length substantially equal to that of the annular plate 18. Thus, the band body 22 has a comparatively high flexibility.

Figure 3A:
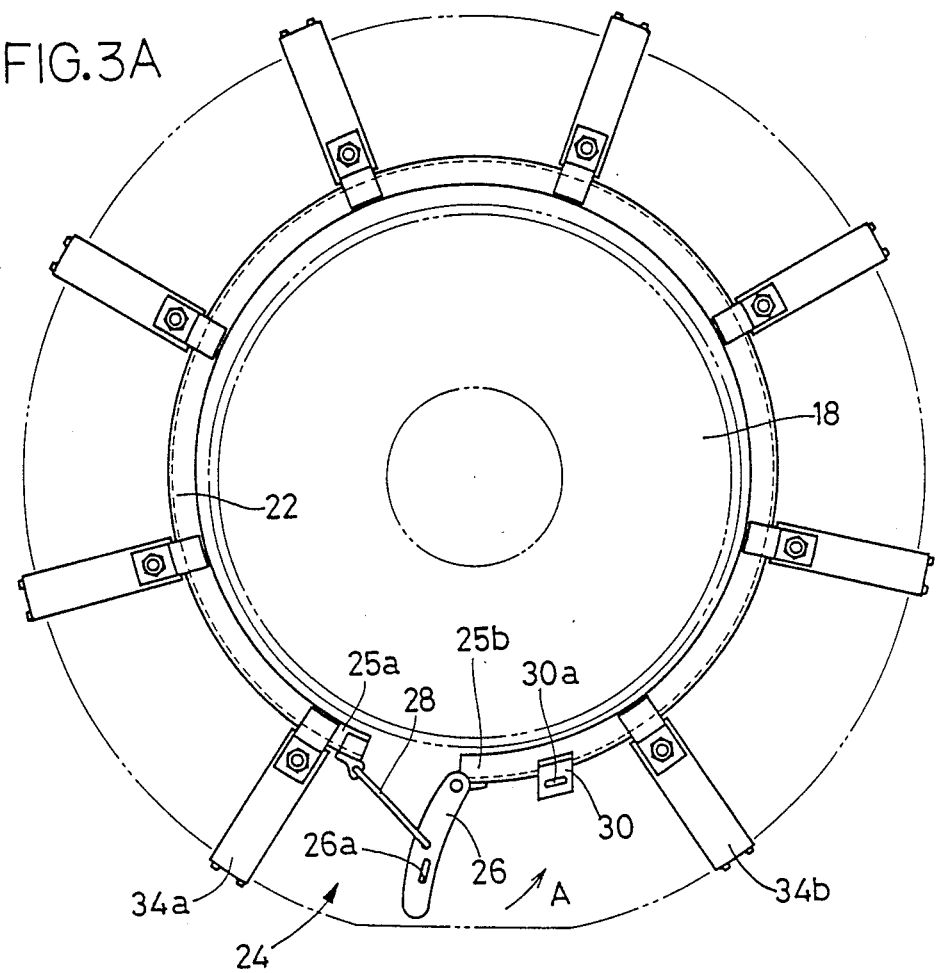
FIG. 3A is an elevational view of the anti-skid device of FIG. 1 with a fastening device of the anti-skid device placed in its loosened position.

As shown in FIG. 3A, the band body 22 has a pair of free ends 25a, 25b which are fastened to, and loosened from, each other by a fastening device 24. The fastening device 24 includes a fastening lever 26 which is pivotably connected at one of longitudinal ends thereof to one of the free ends 25b of the band body 22, and a generally rectangular connecting link 28 which is pivotably connected at one of short sides thereof to the other free end 25a of the band body 22 and pivotably connected at the other short side thereof to a longitudinally intermediate portion of the fastening lever 26. When the fastening device 24 is placed in a fastened position thereof as a result that the fastening lever 26 is tilted down in a direction indicated at A in FIG. 3A, the pair of free ends 25a, 25b of the band body 22 come close to each other so that an inner diameter of the band body 22 becomes smaller than an outer diameter of the peripheral annular portion 20 of the annular plate 18. On the other hand, when the fastening lever 26 is pulled up from the fastened (tilted) position to place the fastening device 24 in a loosened position thereof in a direction reverse to the direction A, the free ends 25a, 25b of the band body 22 are separated from each other, whereby the inner diameter of the band body 22 becomes greater than the outer diameter of the peripheral annular portion 20 of the annular plate 18. In the fastened position of the fastening device 24, the connecting link 28 biases the fastening lever 26 inwardly of the secured band body 22. In other words, the connecting link 28 functions as a center-over type spring having a dead center.

The band body 22 is tightly secured to the peripheral annular portion 20 of the annular plate 18 by first fitting the band body 22 with the loosened fastening device 24, around the peripheral annular portion 20 of the annular plate 18 and subsequently pivoting the fastening lever 26 down in the direction A to place the fastening device 24 in its fastened position. Consequently, the peripheral annular portion 20 of the annular plate 18 tightly engages the V groove 23 of the band body 22. The peripheral annular portion 20 of the annular plate 18 has a tapered cross sectional profile corresponding to the V groove 23 of the band body 22.

Figure 3B:
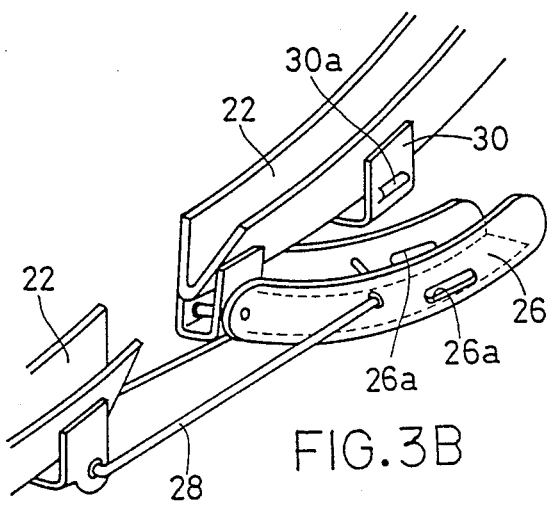
FIG. 3B is an enlarged view of the fastening device placed in its loosened position.
Figure 3C:
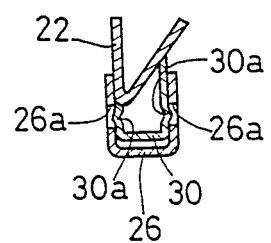
FIG. 3C is a cross sectional view of the fastening device placed in its fastened position.

The fastening lever 26 of the fastening device 24 has a U groove of a generally U-shaped cross sectional profile, so that in the fastened position of the fastening device 24 the fastening lever 26 fits on the band body 22 with the V-shaped outer surface of the band body 22 engaging the U groove of the fastening lever 26. As clearly shown in FIGS. 3B and 3C, the fastening lever 26 has a pair of through-holes 26a for engaging a pair of ridges 30a of an engaging member 30 fixed to the outer V-shaped surface of the band body 22. The engagement of the fastening lever 26 with the engaging member 30, contributes to preventing the fastening device 24 (or fastening lever 26) from being loosened due to vibration produced during running of the automotive vehicle.

As shown in FIG. 1, the band body 22 is provided with eight metallic fixing devices 32 each of which includes a bolt and a nut and which are equidistantly spaced apart from each other on the band body 22. Eight anti-skid arms 34 are fixed at one of longitudinal ends thereof to the band body 22 by the corresponding fixing devices 32. When the band body 22 is tightly secured around the annular plate 18 by the fastening device 24, the eight anti-skid arms 34 extend radially outwardly over an outer lateral surface of the pneumatic tire T, such that the eight anti-skid arms 34 are equiangularly spaced apart from each other in a circumferential direction of the peripheral annular portion 20 of the annular plate 18 (or in a circumferential direction of the tire T).

The anti-skid arms 34 are formed of an elastically deformable material, such as solid urethane rubber or other elastomers, which has not only rubber elasticity but also high wear resistance and high cold resistance. Accordingly, the anti-skid arms 34 are elastically deformable. Each anti-skid arm 34 has a bent-end portion 36, and therefore has a generally L-shape cross sectional profile. When the band body 22 is tightly secured around the annular plate 18 with the fastening device 24, the bent-end portions 36 of the anti-skid arms 34 are brought into elastically forced engagement with a tread surface 38 of the tire T at which surface the automotive vehicle contacts the road surface. The anti-skid arms 34 are elastically deformed to follow the fastening of the band body 22 around the annular plate 18. The anti-skid arms 34 serve to prevent the automotive vehicle from skidding on the ice or snow road surface, such that the bent-end portions 36 of the arms 34 are successively brought into engagement with the ice or snow road surface.

As clearly shown in FIG. 1, the bent-end portion 36 of each of the anti-skid arms 34 has a generally U-shaped notch 40 formed through a free end thereof and extending transversely of the tread surface 38 of the tire T (or longitudinally of the bent-end portion 36). The U-shaped notches 40 contribute to increasing the anti-skidding effect of the anti-skid arms 34. Moreover, the bent-end portion 36 of each anti-skid arm 34 has a plurality of spikes 42 formed of titanium alloy, nickel-chromium alloy, or cobalt and integrally embedded therein. The spikes 42 contribute to increasing gripping effect of the bent-end portions 36 of the anti-skid arms 34 against the frozen road surface.

As shown in FIG. 2, the anti-skid arms 34 have a swollen portion 46 at a longitudinally intermediate location thereof. The swollen portions 46 are swollen axially outwardly of the tire T (or in a laterally outward direction as viewed from the vehicle body). The swollen portions 46 contribute to increasing spring characteristic of the anti-skid arms 34 in a mechanical manner, so that the anti-skid arms 34 are sufficiently deformed to follow increased speed of rotation of the tire T.

The annular plate 18 serving as the setting member on which the band body 22 is mounted, is not always removed from the wheel disk N, even if the band body 22 is removed from the annular plate 18. In other words, the annular plate 18 remains secured to the wheel disk N for a comparatively long period of time, for example during all winter long or all year long like a wheel cover. In such case, the band body 22 with the anti-skid arms 34 is mounted around the annular plate 18 only when the tired vehicle wheel H, T need the complete anti-skid device.

The band body 22 is mounted on the annular plate 18 secured to the wheel disk N, as follows: first, as previously described, the band body 22 having the loosened fastening device 24 and therefore assuming a greater inner diameter than the outer diameter of the annular plate 18, is fitted loosely around the peripheral annular portion 20 of the annular plate 18. When the band body 22 has an enlarged diameter with the fastening device 24 placed in the loosened position, the bent end portions 36 of the anti-skid arms 34 define an enlarged circle as compared with a proper circle defined by the same 36 when the band body 22 is closely fastened around the annular plate 18 with the fastening device 24 placed in the fastened position. Thus, the band body 22 is fitted with ease around the annular plate 18. At the same time the bent end portions 36 of the anti-skid arms 34 are smoothly located in position on the tread surface 38 of the tire T. In other words, the instant anti-skid device is free from a problem of the difficulty of mounting of the bent-end portions 36 of the anti-skid arms 34 on the tread surface 38 of the tire T.

The anti-skid arms 34 are angularly spaced apart from each other by a sufficient distance, so that the anti-skid arms 34 can be located in position around the tread surface 38 in a manner in which a pair of adjacent two anti-skid arms 34 (or a pair of adjacent two bent-end portions 36) are located on both sides of a portion of the tread surface 38 at which the tire T contacts the road surface. In particular, the two anti-skid arms 34a, 34b (FIG. 3A) in the vicinity of the free ends 25a, 25b of the band body 22, respectively, are most advantageous because, before the band body 22 is fastened around the annular plate 18, the anti-skid arms 34a, 34b are spaced a greater distance from each other than the other pairs of adjacent two anti-skid arms 34. Since both the diameter of the annular band body 22 and the circle defined by the anti-skid arms 34 are variable due to the flexibility of the band body 22 and the elasticity of the anti-skid arms 34, the band body 22 and the anti-skid arms 34 are easily mounted on the annular plate 18 and around the tire T, respectively. Thus, it is not necessary to move the automotive vehicle forward or backward to place the instant anti-skid device in condition for service.

After the band body 22 is fitted loosely around the peripheral annular portion 20 of the annular plate 18, the fastening lever 26 of the fastening device 24 is tilted down in the direction A (FIG. 3) to fasten the free ends 25a, 25b of the band body 22 to each other. Subsequently, a free end of the tilted fastening lever 26 remote from the pivoted end thereof, is fastened on the band body 22 by engagement of the through-holes 26a with the ridges 30a of the engaging member 30. Thus, the inner diameter of the band body 22 is reduced, whereby the tapered peripheral annular portion 20 of the annular member 18 tightly engages the V groove 23 of the band body 22. Consequently, the band body 22 is securely mounted around the annular plate 18. Because of the reduction of the inner diameter of the band body 22, the anti-skid arms 34 are displaced radially inwardly toward the annular plate 18, whereby the circle defined by the bent-end portions 36 of the anti-skid arms 34 is also reduced. In other words, the bent-end portions 36 are elastically deformed and brought into elastically forced engagement with the tread surface 38 of the tire T.

As described above, with the band body 22 mounted around the annular member 18 by the fastening device 24, the bent-end portions 36 of the anti-skid arms 34 are in close contact with the tread surface 38 of the tire T due to the elastically forced engagement therebetween. Accordingly, even if the outer diameter of the tire T is reduced due to wearing, the close contact between the anti-skid arms 34 and the tire T is well maintained. As a result, the instant anti-skid device is free from the problem of uncomfortable vibration transmitted to the vehicle body which vibration is generated by such anti-skid devices which permit an undesirable gap to be produced between bent-end portions of anti-skid arms and a tread surface of a pneumatic tire as the tire wears out. Moreover, since the close engagement between the anti-skid arms 34 and the tire T is well maintained during running of the vehicle, the anti-skid arms 34 are not subjected to a large torsional stress. Thus, the durability of the anti-skid arms 34 are improved.

When the band body 22 is removed from the annular plate 18, it is required to park the automotive vehicle such that no anti-skid arm 34 is sandwiched between the tire T and the road surface. After the automotive vehicle is parked, the fastening lever 26 is pulled up to loosen the fastening device 24, and subsequently the band body 22 is drawn off the tire T. With the fastening device 24 loosened, the inner diameter of the band body 22 becomes larger than the outer diameter of the peripheral annular portion 20 of the annular plate 18, and the circle defined by the bent end portions 36 of the anti-skid arms 34 becomes larger than the outer diameter of the tire T. Thus, the band body 22 and the anti-skid arms 34 fixed to the band body 22, are easily removed from the vehicle wheel H and the tire T, respectively.

As is apparent from the foregoing, the anti-skid arms 34 of the instant anti-skid device are securely located in position on the tread surface 38 of the tire T without jacking up the vehicle body or moving the automotive vehicle forward or backward. Thus, the instant anti-skid device is handled with ease, as compared with snow chains (tire chains). Further, no exclusive aid member is needed to mount and remove the band body 22 with the anti-skid arms 34 on or from the vehicle wheel H and tire T. In this respect, the anti-skid device is superior to the prior art anti-skid device disclosed by the previously indicated U.S. Patent. Moreover, the band body 22 is easily mounted around, and removed from, the annular plate 18 since the band body 22 has the fastening device 24 selectively placed in the fastened and loosened positions. The bent-end portions 36 of the anti-skid arms 34 tightly engage the tread surface 38 of the tire T as a result that the fastening device 24 is placed in its fastened position. The close contact between the anti-skid arms 34 and the tire T is well maintained during running of the automotive vehicle, thus leading to preventing generation of the uncomfortable vibration. Also, the durability of the anti-skid arms 34 is prolonged. Because of the simple structure in which the band body 22 with the anti-skid arms 34 is directly secured to the annular plate 18 to complete the instant anti-skid device, the anti-skid device consists of a minimized number of parts.

Referring next to FIGS. 4 and 5, there is shown another anti-skid device embodying the present invention. In the figures, the same reference numerals as used in FIGS. 1 through 3C, are used to designate corresponding elements or parts of the present anti-skid device. Repetitive description of those elements and parts are omitted.

Reference numeral 50 designates a setting member in the form of a disk which is formed of a material similar to that of the annular plate 18 of the embodiment of FIGS. 1 through 3C. The disk 50 is secured to the outer lateral surface of the wheel disk N. As contrasted with the annular plate 18 of the preceding embodiment, however, the disk 50 has no central opening, and is provided on an outer circumferential surface thereof with an elastically deformable member in the form of a rubber body 56.

As clearly contrasted with the band body 22 serving as the supporting member for the preceding embodiment, a supporting member for the instant embodiment which is mounted around a peripheral annular portion 54 of the disk 50 (or around an outer circumferential surface of the rubber body 56), consists of a chain body 52 including eight inner link plates 58 and seven outer link plates 60 which are alternately connected to each other such that the inner and outer link plates 58, 60 overlap each other at longitudinal ends thereof, and that each link plate 58, 60 is pivotably connected at the overlapped ends thereof to the adjacent two links 58, 60 by axis pins 62. Each inner link plate 58 consists of a single arcuate metallic plate having a comparatively small radial length, while each outer link plate 60 consists of a pair of arcuate metallic plates having a comparatively large radial length.

Each inner link plate 58 has a thickness generally equal to that of the peripheral annular portion 54 of the disk 50. The pair of radially wide plates of each outer link plate 60 sandwich the adjacent two inner link plates 58, such that, with the chain body 52 is mounted around the disk 50, outer arcuate peripheries of the inner and outer link plates 58, 60 are aligned with each other and that inner arcuate peripheries of the outer link plates 60 are located a predetermined distance radially inwardly of inner arcute peripheries of the inner link plates 58. As shown in FIGS. 4 and 5, the chain body 52 is mounted around the peripheral annular portion 54 of the disk 50 such that the pair of metallic plates of each of the outer link plates 60 sandwich the peripheral annular portion 54 of the disk 50 while each of the inner link plates 58 is seated on the outer circumferential surface of the rubber body 56 on the outer circumferential surface of the disk 50.

A pair of the inner link plates 58a, 58b are located at a pair of free ends of the chain body 56. One of the free-end inner link plates 58a is provided with a pivot-axis member 64 to which an eye bolt 68 is pivotably connected. A fly nut 66 is engaged with the eye bolt 68. The other free-end inner link plate 58b is provided with a through-hole member 70 which has a through-hole through which the eye bolt 68 is passed so as to be engaged with the fly nut 66. With the chain body 52 mounted around the disk 50 by the pivot-axis and through-hole members 64, 70 and the eye bolt and fly nut 68, 66, the inner link plates 58 of the chain body 52 define a circle which is smaller an appropriate amount than the rubber body 56 disposed around the peripheral annular portion 54 of the disk 50. In other words, when the free-end inner link plates 58a, 58b are fastened to each other by the pivot-axis and through-hole members 64, 70 and the eye bolt and fly nut 68, 66, with the inner link plates 58 seated around the outer circumferential surface of the rubber body 56, the rubber body 56 is elastically deformed or constricted by an appropriate amount under pressure produced between the inner link plates 58 and the peripheral annular portion 54 of the disk 50.

Each inner link plate 58 supports at a longitudinally intermediate portion thereof an anti-skid arm 34 similar to the anti-skid arms 34 of the preceding embodiment of FIGS. 1 through 3C.

The chain body 52 of the present anti-skid device is mounted around the disk 50, as follows: first, the chain body 52 with the pivot-axis and through-hole members 64, 74 apart from each other, is fitted loosely around the disk 50 such that the two plates of each of the outer link plates 60 sandwich the peripheral annular portion 54 of the disk 50 while the inner surfaces of the inner link plates 58 contact the outer circumferential surface of the rubber body 56. Subsequently, the pivot-axis and through-hole members 64, 70 disposed on the respective free-end inner link plates 58a, 58b are fastened to each other by the thread engagement between the eye bolt 68 and the fly nut 66. Meanwhile, the chain body 52 is removed from the disk 50 by first loosening the engaged eye bolt and fly nut 68, 66 from each other and subsequently taking the chain body 52 apart from the peripheral annular portion 54 of the disk 50.

So long as the pivot-axis and through-hole members 64, 70 are not fastened to each other, the chain body 52 and the bent-end portions 36 of the anti-skid arms 34 can be "opened" at the pair of free ends thereof because of the pivotal connections between the inner and outer link plates 58, 60. Consequently, the chain body 52 and the bent-end portions 36 of the anti-skid arms 34 are easily mounted around the peripheral annular portion 54 of the disk 50 and located in position around the tread surface 38 of the tire T, respectively, similar to the preceding embodiment of FIGS. 1 through 3C. When the eye bolt 68 and the fly nut 66 are engaged with each other after the chain body 52 is fitted loosely around the peripheral annular portion 54 of the disk 50 and the inner link plates 58 are seated on the outer circumferential surface of the rubber body 56, the rubber body 56 is constricted between the inner link plates 58 and the peripheral annular portion 54 of the disk 50. Thus, the chain body 52 is tightly and securely mounted around the peripheral annular portion 54 of the disk 50. Moreover, the bent-end portions 36 of the anti-skid arms 34 are brought into close contact with the tread surface 38 of the tire T due to the elastic deformation thereof.

As is apparent from the foregoing, the present anti-skid device has the same advantages as those of the first embodiment of FIGS. 1 through 3C. Furthermore, the anti-skid device has an additional advantage that, when not used, the chain body 52 can be kept in a comparatively narrow space since the chain body 52 can be folded because of the pivotal connections between the inner and outer link plates 58, 60. Moreover, the rubber body 52 disposed between the chain body 52 and the disk 50 contributes to not only preventing the uncomfortable vibration from being transmitted to the vehicle body, but also accommodating dimensional errors of the chain body 52 with respect to the disk 50. Thus, the fastening force, with which the chain body 52 is fastened around the disk 50, is uniformly produced between the chain body 52 and the peripheral annular portion 54 of the disk 50. In the present embodiment, the fastening device consists of the pivot-axis member 64, through-hole member 70, eye bolt 68 and fly nut 66.

Figure 6:
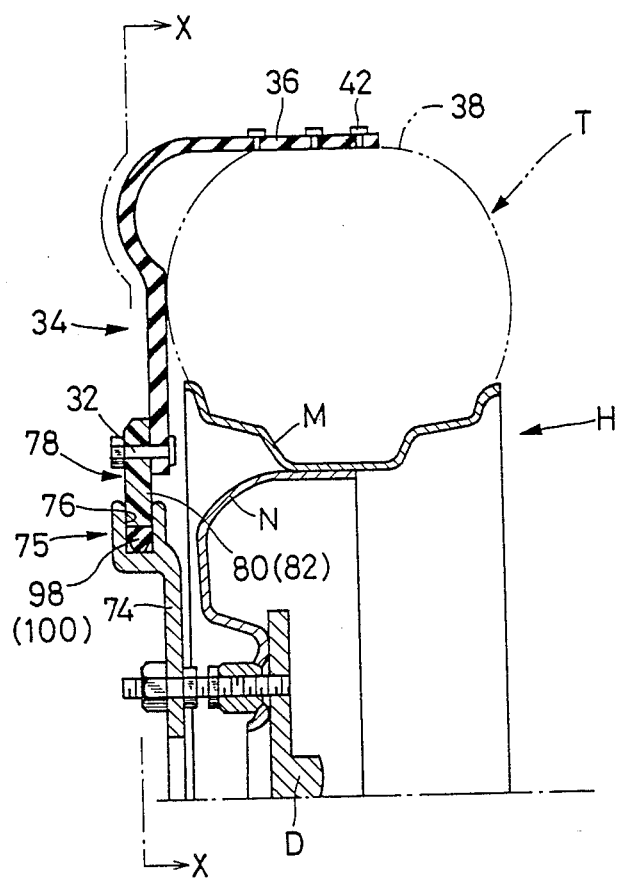
FIG. 6 is a cross sectional view of a part of yet another embodiment of the anti-skid device of the present invention.
Figure 7:
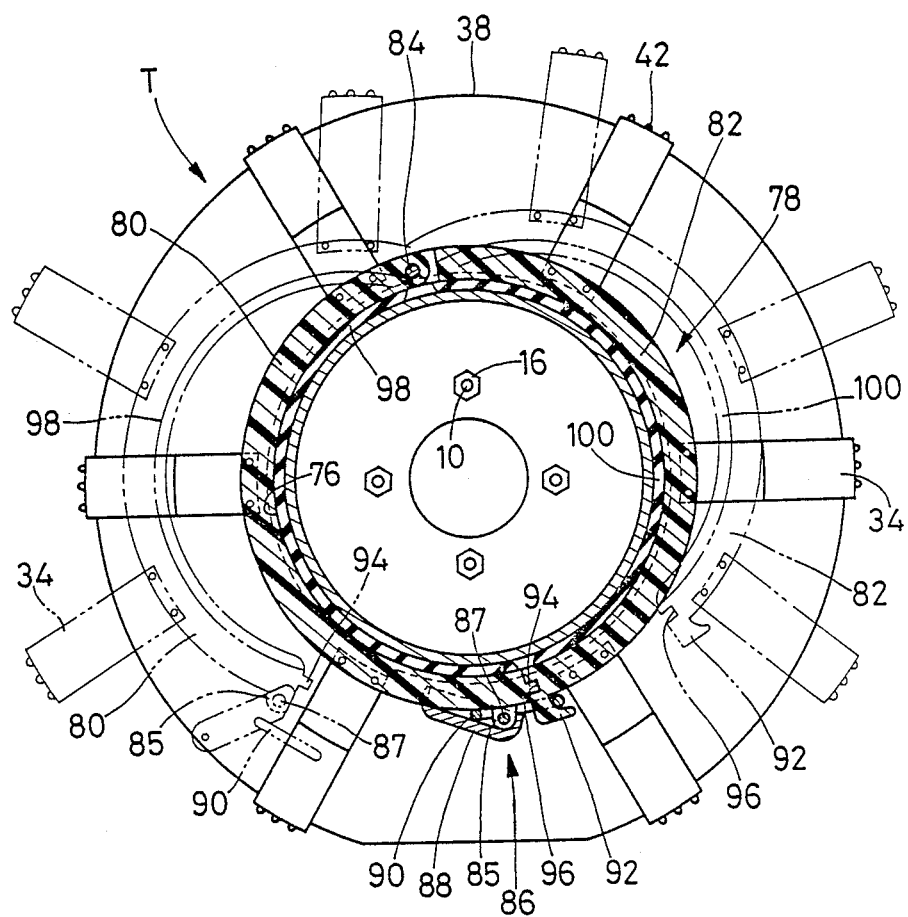
FIG. 7 is a cross sectional view of the anti-skid device of FIG. 6 taken along the line X—X.

A third embodiment of the anti-skid device of the present invention is illustrated in FIGS. 6 and 7.

The instant anti-skid device includes a setting member in the form of an annular plate 74 which is secured to the wheel disk N similar to the annular plate 18 of the first embodiment of FIGS. 1 through 3C. The annular plate 74 includes a peripheral annular stepped portion 75 which has an annular groove 76 formed in an outer circumferential surface thereof and opening radially outward. The annular stepped portion 75 defining the annular groove 76 serves as the annular setting portion on which a supporting member 78 is mounted. The annular plate 74 having the annular groove 76 is formed of aluminum alloy, for example.

As shown in FIG. 7, the supporting member 78 of the instant anti-skid device includes a pair of arcuate bodies 80, 82 which cooperate with each other to provide an annular configuration when mounted around the annular plate 74. The pair of arcuate bodies 80, 82 are pivotably connected to each other at longitudinal ends thereof by an axis pin 84. A pair of free ends of the arcuate bodies 80, 82 are provided with a fastening device 86 for fastening the free ends to each other so as to fasten the arcuate bodies 80, 82 around the annular plate 74.

The fastening device 86 consists of a metallic through-hole member 85 provided at the free end of one of the arcuate bodies 80, a fastening lever 88, an axis pin 87 for pivotably connecting the fastening lever 88 to the through-hole member 85, a generally rectangular connecting link 90 pivotably connected at one of short sides thereof to a longitudinally intermediate portion of the fastening lever 88, and an engaging member 92 provided at the free end of the other arcuate body 82 for engaging the other short side of the connecting link 90 so as to fasten the pair of arcuate bodies 80, 82 around the annular plate 74. In a loosened position of the fastening device 86 in which the connecting link 90 is not in engagement with the engaging member 92, the pair of arcuate bodies 80, 82 are permitted to be pivoted relative to each other about the axis pin 84, as shown in phantom line in FIG. 7, so that the arcuate bodies 80, 82 are opened wide at the pair of free ends thereof. On the other hand, in a fastened position of the fastening device 86 in which the connecting link 90 is engaged with the engaging member 92 and the fastening lever 88 is engaged with the arcuate body 80, the free ends of the pair of arcuate bodies 80, 82 tightly engage each other so as to assume an annular configuration around the annular plate 74, whereby the arcuate bodies 80, 82 serving as the supporting member are securely received in the annular groove 76 of the annular plate 74.

Each of the arcuate bodies 80, 82 consists of an extruded body of a resin such as ABC resin (acrylonitrile butadiene styrene copolymer). Mating end surfaces of the pair of arcuate bodies 80, 82 are provided with a pair of engageable boss and recess 94, 96, respectively. With the fastening device 86 placed in its fastened position, the boss 94 fits in the recess 96, whereby the pair of arcuate bodies 80, 82 are tightly secured around the annular plate 74 while assuming a sound circle therearound.

The arcuate bodies 80, 82 are provided at inner surfaces thereof with elastically deformable members 98, 100 fixed thereto, respectively, which are formed of a rubber material, for example. With the arcuate bodies 80, 82 secured around the annular plate 74 by the fastening device 86, an inner diameter of the secured arcuate bodies 80, 82, that is, an outer diameter of the pair of elastically deformable members 98, 100 is slightly smaller than an outer diameter of the annular plate 74 (or annular stepped portion 75). The elastically deformable members 98, 100 are constricted under the pressure produced between the annular plate 74 and the pair of arcuate bodies 80, 82 fastened around the annular plate 74.

Each arcuate body 80, 82 is provided with three anti-skid arms 34 fixed thereto. With the pair of arcuate bodies 80, 82 fastened around the annular plate 74, the six anti-skid arms 34 extend radially outwardly in equiangularly spaced apart relation with each other in a circumferential direction of the tire T.

In the instant anti-skid device, the pair of arcuate bodies 80, 82, i.e., the supporting member 78 can be pivoted about the axis pin 84, so that when the supporting member 78 is opened wide then the six anti-skid arms 34 are also opened wide, whereby the supporting member 78 is easily fitted in the annular groove 76 of the annular stepped portion 75 of the annular plate 74 and the bent-end portions 36 of the anti-skid arms 34 are easily located in position around the tread surface 38 of the tire T.

As described above, in the fastened position of the fastening device 86 in which the free ends of the pair of arcuate bodies 80, 82 are engaged with each other so as to mount the arcuate bodies 80, 82 in the annular groove 76 of the annular plate 74, the rubber members 98, 100 are elastically deformed under the pressure produced between the annular plate 74 and the arcuate bodies 80, 82, whereby the arcuate bodies 80, 82 are tightly and securely mounted around the annular plate 74. Moreover, when the arcuate bodies 80, 82 are closed by the fastening device 86 so as to be mounted around the annular plate 74, the anti-skid arms 34 are closed together, so that the bent-end portions 36 of the arms 34 are brought into elastically forced engagement with the tread surface 38 of the tire T.

As is apparent from the foregoing, the instant anti-skid device is easily mounted on the tire T and exhibits the same advantages as those of the embodiment of FIGS. 1–3C, specifically close contact of the bent-end portions 36 of the anti-skid arms 34 with the tread surface 38 of the tire T, prevention of the generation of the uncomfortable vibration, and prolonged durability of the anti-skid arms 34. The instant anti-skid device has additional advantages similar to the advantages of the preceding embodiment of FIGS. 4 and 5, that is, stabilized fastening force between the arcuate bodies 80, 82 and the annular plate 74 and prevention of the transmission of the uncomfortable vibration to the vehicle body, since the instant anti-skid device includes the elastically deformable members 98, 100 disposed between the arcuate bodies 80, 82 and the annular plate 74.

Figure 8:
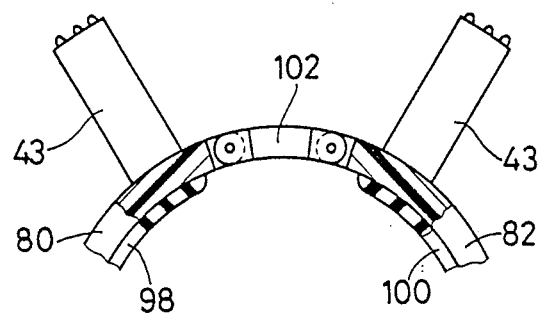
FIG. 8 is a front view of a part of a still further embodiment of the anti-skid device of the present invention.

In FIG. 8, there is shown a modified form of the above-described third embodiment of the anti-skid device. In the modified anti-skid device, a pair of arcuate bodies 80, 82 serving as the supporting member are connected to each other via an arcuate connecting link 102 such that each arcute body 80, 82 is pivotable relative to the arcuate link 102. The pair of arcuate bodies 80, 82 and the arcuate connecting link 102 cooperate to each other to assume an annular configuration around the annular plate 74 when mounted around the annular plate 17.

Alternatively, the supporting member 78 may be constituted by more than three arcuate bodies which are pivotably connected to each other and have a pair of free ends at which the supporting member 78 is opened and closed.

Figure 9:
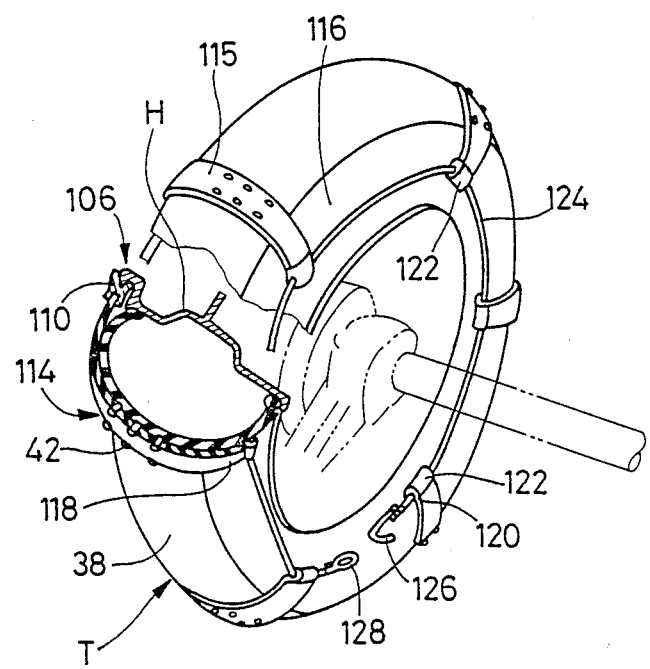
FIG. 9 is a perspective view of another embodiment of the anti-skid device of the present invention, as viewed from the side of the vehicle body.

Referring to FIG. 9, there is shown another anti-skid device embodying the present invention.

In the present anti-skid device, the wheel rim M has a flanged portion 106 formed integrally therewith such that the flanged portion 106 is concentric with the wheel rim M. The flanged portion 106 extends radially outwardly, and accordingly the wheel rim M has a L-shape cross sectional profile at the flanged portion 106. The flanged portion 106 serves as a setting member on which a supporting member 110 is amounted. Thus, the flanged portion 106 corresponds to the annular setting portion of the setting member. The wheel rim M having the integral flanged portion 106 is formed by molding aluminum alloy, for example.

The supporting member 110 consists of a band-like member similar to the band body 22 of the anti-skid device of FIGS. 1–3C. The supporting member 110 is provided at free ends thereof with a fastening device (not shown) similar to the fastening device 24 of the anti-skid device of FIGS. 1–3C. With the supporting member 110 mounted around the flanged portion 106 of the wheel rim M, the flanged portion 106 is tightly fitted in a V groove of the supporting member 110.

Half a dozen of anti-skid arms 114 are fixed to the supporting member 110 in a manner similar to the anti-skid arms 34 of the anti-skid device of FIGS. 1–3C, so that bent-end portions 115 of the anti-skid arms 114 are equiangularly spaced apart from each other around the tread surface 38 of the tire T. Each anti-skid arm 114 is formed of a resilient material such as NR (natural rubber), as contrasted with the anti-skid arms 34 of the anti-skid device of FIGS. 1–3. The anti-skid arms 114 have a generally U-shape cross sectional profile. With the supporting member 110 fastened around the flanged portion 106, free ends 118 of the anti-skid arms 114 face a body-side lateral surface 116 of the tire T which surface is nearer to the vehicle body than the outer lateral surface of the tire T. The anti-skid arms 114 are provided at the free ends 118 thereof with respective metallic through-hole members 122 having a through-hole 120 formed therethrough in the circumferential direction of the tire T. Longitudinally intermediate portions of the bent-end portions 115 of the anti-skid arms 114 which grip the tread surface 38 of the tire T, are provided with a suitable number of spikes 42 similar to the spikes 42 of the bent-end portions 36 of the anti-skid device of FIGS. 1–3C.

A single rubber cord 124 is slidably passed through the through-holes 120 of the metallic members 122 provided at the free ends 118 of the anti-skid arms 114, and a pair of free ends of the rubber cord 124 are located between the pair of adjacent two anti-skid arms 114 between which the fastening device is provided on the side of the outer lateral surface of the tire T. The free ends of the rubber cord 124 are provided with a joining device consisting of a hook member 126 at one free end and an eye member 128 at the other free end, which are joined to each other so as to couple the free ends of the rubber cord 124 to each other.

The supporting member 110 with the anti-skid arms 114 are mounted on the tire T, as follows: first, the fastening device for the supporting member 110 is placed in its loosened position, while the joining device for the rubber cord 124 is placed in its released condition in which the hook and eye members 126, 128 are apart from each other. Subsequently, the supporting member 110 is fitted loosely around the flanged portion 106 of the wheel rim M, such that the spiked bent-end portions 115 of the anti-skid arms 114 are located around the tread surface 38 of the tire T. Since the anti-skid arms 114 are formed of a resilient material, the bent-end portions 115 of the anti-skid arms 114 are easily mounted on the tire T. Last, the fastening device is placed in its fastened position so as to fasten the supporting member 110 around the flanged portion 106 integral with the wheel rim M, and the hook and eye members 126, 128 are joined to each other such that the rubber cord 124 is maintained to be stretched. Because of a reduced diameter of the mounted supporting member 110 on one hand and an elastic force exerted to the anti-skid arms 114 due to the stretched rubber cord 124 on the other hand, the bent-end portions 115 of the anti-skid arms 114 are elastically forcedly engaged with the tread surface 38 of the tire T. Thus, the close contact between the anti-skid arms 114 and the tire tread surface 38 is well maintained during running of the automotive vehicle.

The present anti-skid device has the same advantages as those of the first embodiment of FIGS. 1 through 3C. Moreover, even if the anti-skid arms 114 are subjected to considerably large centrifugal force exerted thereto during running of the automotive vehicle, the stretched rubber cord 124 contributes to preventing the anti-skid arms 114 from being displaced away from, or floating off, the tread surface 38 of the tire T. Accordingly, the present anti-skid device more effectively prevents generation of the uncomfortable vibration resulting from an undesirable gap produced between anti-skid arms and a tire tread surface.

In place of the single rubber cord 24, it is possible to connect the six free ends 118 of the six anti-skid arms 114, by using six rubber cords independent of each other. Furthermore, the joining device (hook and eye members 126, 128) may be provided between the free ends 118 of each of two or more pairs of adjacent two arms 114.

Figure 10:
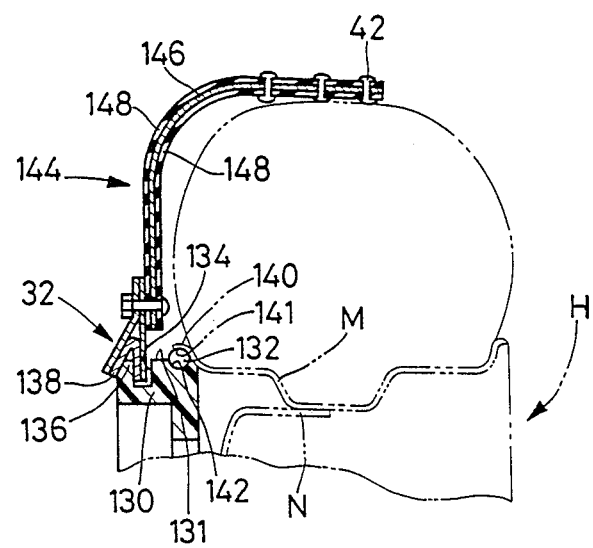
FIG. 10 is a cross sectional view of a part of yet another embodiment of the anti-skid device of the present invention.

Referring to FIG. 10, there is shown another anti-skid device embodying the present invention, which is particularly different from the preceding embodiments regarding the manner in which a setting member is secured to the vehicle wheel H.

The setting member for the present anti-skid device consists of an annular plate 130 which is an extrudated body of a resin such as polyacetal. The annular plate 130 is secured at an outer circumferential surface 131 thereof to the wheel rim M via a ring member 132 which is formed of an elastically deformable material such as rubber and has a circular cross section. The annular plate 130 has an annular groove 134 formed in the outer circumferential surface 131 thereof. Since the annular groove 134 is provided in the vicinity of one of axial ends of the annular plate 130 remote from the other axial end thereof at which the annular plate 130 is secured to the wheel rim M, the annular groove 134 defines a radially outwardly protruding annular flange 136 serving as the annular setting portion of the setting member around which is secured a supporting member 138 having a structure similar to that of the band body 22 of the first embodiment of FIGS. 1–3C.

More specifically described, the wheel rim M has, at an outer lateral surface thereof remote from the vehicle body, a groove-defining portion 140 defining an annular groove 141 which has an arcuate cross section corresponding to the circular cross section of the ring member 132 and opens radially inward. The elastically deformable ring member 132 is press fitted in the annular groove 141 of the wheel rim M. Meanwhile, the annular plate 130 has, in the outer circumferential surface 131 thereof, an annular groove 142 having an arcuate cross section corresponding to the circular cross section of the ring member 132. The annular groove 142 is remote from the annular flange 136 by a suitable distance at the outer circumferential surface 131 of the annular plate 130. The annular plate 130 is secured at the annular groove 142 to the wheel rim M such that the ring member 132 fixed in the annular groove 141 of the wheel rim M is held in the annular groove 142 as a result that the annular plate 130 is press fitted in the ring member 132. Thus, the annular plate 130 is secured to the wheel rim M.

The supporting member 138 is provided with a suitable number of anti-skid arms 144 each having a bent-end portion similar to the bent-end portions 36 of the anti-skid arms 34 of the embodiment of FIGS. 1–3C. However, each of the anti-skid arms 144 consists of a sheet spring 146 and a pair of elastic rubber layers 148 disposed on opposite surfaces of the sheet spring 146.

The present anti-skid device are more easily mounted on, and removed from, the vehicle wheel H of the tire T, since the annular plate 130 serving as the setting member is attached to, and detached from, the wheel rim M without using any bolts and nuts.

In place of the elastically deformable ring member 132, it is possible to provide the wheel rim H with an integral annular convex portion having an arcuate cross section corresponding to the arcuate cross section of the annular groove 142 of the annular plate 130. If the wheel rim M is so constructed, a portion of the annular plate 130 which portion defines the annular groove 142 is preferably formed of an elastically deformable material such as rubber.

While the present invention has been described in preferred embodiments with detailed particularities, it is to be understood that the invention may be embodied with various modifications.

While the supporting member of each of the illustrated embodiments is formed of metal or resin, it is possible to form a part or whole of the supporting member by using a rubber material. In such case, it is recommended that the annular setting portion of the setting member around which the supporting member is mounted, be constructed to have an annular groove, so that the rubber supporting member is fitted in the annular groove. If the setting member is so constructed, the rubber supporting member is prevented from coming off the setting member due to elastic deformation thereof during running of the automotive vehicle.

Furthermore, in place of the anti-skid arms adapted to be fixed to the supporting member with bolts and nuts for exchange purposes, it is possible to permanently fix the anti-skid arms to the supporting member, specifically in the case where the anti-skid arms are formed by molding. Alternatively, it is possible to form the supporting member and the anti-skid arms to be integral with each other out of a resin or a rubber material.

It is to be understood that the present invention may be embodied with other modifications, changes and improvements that may occur to those skilled in the art without departing from the spirit and scope of the invention defined in the appended claims.

What is claimed is:

1. An anti-skid device for mounting on a vehicle wheel with a tire, the anti-skid device comprising:
   a setting member, said setting member being securable to said vehicle wheel, said setting member including a peripheral annular setting portion which is concentric with said vehicle wheel after securement thereto;
   a deformable supporting member removably mountable around said peripheral annular setting portion of said setting member;
   fastening means for tightly securing said deformable supporting member around said peripheral annular setting portion of said setting member by fastening a pair of free ends of said supporting member to each other, said supporting member deforming and assuming a generally annular configuration around said peripheral annular setting portion when fastened thereto, said supporting member fitting loosely around said peripheral annular setting portion unless said free ends of said supporting member are fastened to each other by said fastening means; and
   a plurality of elastically deformable anti-skid arms fixed to said deformable supporting member, said anti-skid arms extending radially outwardly over a side wall of said tire and being angularly spaced apart from each other in a circumferential direction of said tire when mounted thereon, each of said anti-skid arms including a bent portion which is elastically deformed and forcedly engaged with a tread surface of said tire when said supporting member is tightly secured around said peripheral annular setting portion by fastening said free ends of said supporting member to each other with said fastening means.

2. An anti-skid device according to claim 1, further comprising an elastically deformable member disposed between said setting member and said deformable supporting member, said deformable supporting member being tightly secured around said peripheral annular setting portion of said setting member via said elastically deformable member by fastening said free ends of said deformable supporting member to each other with said fastening means.

3. An anti-skid device according to claim 1, wherein said supporting member comprises a deformable band body, said deformable band body including an elongate strip which is bent along a longitudinal direction thereof so as to have a groove and is shaped to have a generally annular configuration in which said groove opens toward a center of said annular configuration.

4. An anti-skid device according to claim 3, wherein said band body has a V groove of a generally V-shape cross section, while said peripheral annular setting portion of said setting member has a tapered cross section corresponding to the V groove of said band body, said band body being fastened around said peripheral annular setting portion by said fastening means, such that the tapered peripheral annular setting portion of said setting member is fitted in the V groove of said band body.

5. An anti-skid device according to claim 1, wherein said deformable supporting member comprises a chain body including a plurality of link plates and a plurality of axis pins for pivotably connecting said link plates to each other.

6. An anti-skid device according to claim 1, wherein said deformable supporting member comprises a plurality of arcuate bodies and connecting means for pivotably connecting said arcuate bodies to each other, each of said arcuate bodies having a radius of curvature corresponding to a radius of said peripheral annular setting portion of said setting member.

7. An anti-skid device according to claim 1, further comprising a connecting member and joining means, the bent portions of said anti-skid arms extending transversely over said tread surface of said tire and facing at free ends thereof the other of said side walls of said tire, the free end of each of said bent portions being connected by said connecting member to the free end of each of the two bent portions on both sides of said each bent portion, said connecting member having a pair of free ends at a location between the free ends of a pair of adjacent bent portions of said bent portions, said pair of free ends of said connecting member being joined to each other by said joining means so that displacement of the free end of each of said bent portions is restricted.

8. An anti-skid device according to claim 1, further comprising an annular member for attachment to a vehicle wheel such that said annular member is concentric with said vehicle wheel when attached thereto, said setting member having an annular groove of a generally arcuate cross section, said annular member having a generally circular cross section corresponding to the arcuate cross section of said annular groove of said setting member, at least one of said setting member and said annular member being formed of elastically deformable material, said setting member being securable to said vehicle wheel via said annular member such that said annular member is press fitted into said annular groove in said setting member.

9. A combination comprising:
   a wheel;
   a tire mounted on said wheel;
   a setting member having a peripheral annular setting portion, said setting member being secured to said wheel;
   a deformable supporting member having a pair of free ends, said deformable supporting member being removably mountable around said peripheral annular setting portion;
   fastening means for tightly securing said deformable supporting member around said peripheral annular setting portion of said setting member by fastening said pair of free ends of the supporting member to each other, said supporting member deforming and assuming a generally annular configuration around said annular setting portion when fastened thereto, the supporting member being fitted loosely around said annular setting portion unless said free ends of the supporting member are fastened to each other by said fastening means; and a plurality of elastically deformable anti-skid arms attached to said deformable supporting member, said anti-skid arms extending radially outwardly over a side wall of said tire when mounted thereon and being angularly spaced apart from each other in a circumferential direction of said tire, each of said anti-skid arms including a bent portion which is elastically deformed and forcedly engaged with a tread surface of said tire when said supporting member is tightly secured around said annular setting portion by fastening said free ends of said supporting member to each other with said fastening means.

10. The combination of claim 9, wherein said setting member is integral with the wheel.

11. The combination as set forth in claim 10, wherein said wheel includes an annular flanged portion which extends radially outwardly and is concentric with said wheel, said deformable supporting member being removably mounted around said annular flanged portion of said wheel, said annular flanged portion of said wheel defining said peripheral annular setting portion of said setting member.

12. The combination as set forth in claim 11, wherein said wheel includes a rim formed integral therewith, said tire being mounted on said rim, said wheel further including a wheel disk around which said rim is located, said annular flanged portion of said wheel extending radially outwardly from said rim.

13. The combination as set forth in claim 9, wherein said wheel includes a rim formed integral therewith, said tire being mounted on said rim, said rim having an annular groove of a generally arcuate cross section which opens radially inwardly, said setting member comprising a ring member fixed to said wheel such that said ring member is concentric with the wheel, and an annular plate having an annular groove of a generally arcuate cross section which opens radially outwardly, said ring member having a generally circular cross section corresponding to the arcuate cross sections of the annular grooves of said rim and said annular plate, at least one of said annular plate and said ring member being formed of elastically deformable material, said ring member being attached to said rim by being press fitted into the annular groove of said rim, said annular plate being secured to said wheel via said ring member such that said annular groove of said annular plate is press fitted over said ring member, said annular plate including an annular flange on which said deformable support member is tightly securable, said annular flange of said annular plate serving as said peripheral annular setting portion of said setting member.

14. The combination as set forth in claim 9, wherein said setting member is separate from the wheel and includes means for attaching the setting member to said wheel.

15. An anti-skid device for a vehicle wheel with a tire, said vehicle wheel including a wheel disk comprising:

a setting member, said setting member being securable to a wheel disk, and including a peripheral annular setting portion concentric with said wheel disk when attached thereto, said peripheral annular setting portion having a tapered cross section;

a supporting member which is changeable in shape and is removably mounted around said peripheral annular setting portion of said setting member, said supporting member comprising a deformable band body, said deformable band body including an elongate metallic strip which is bent along a longitudinal direction thereof so as to have a groove and is shaped to have a generally annular configuration in which said groove opens toward a center of said annular configuration;

fastening means for tightly securing said deformable band body around said tapered peripheral annular setting portion of said setting member by fastening a pair of free ends of the band body to each other, said band body deforming and assuming a generally annular configuration around the annular setting portion when fastened thereto, the band body being fitted loosely around the annular setting portion unless said free ends of the band body are fastened to each other by said fastening means, said fastening means comprising a center-over type spring having a dead center; and a plurality of elastically deformable, urethane rubber-formed anti-skid arms each of which is fixed at one end thereof to said deformable band body, said anti-skid arms extending radially outwardly over an outside one of opposite walls of a tire when mounted thereon and being angularly spaced apart from each other in a circumferential direction of said tire, said each anti-skid arm including a bent-end portion of a generally L-shaped cross section, the L-shaped bent-end portion of said each anti-skid arm being elastically deformed and forcedly engaged with a tread surface of said tire when the band member is tightly secured around said tapered annular setting portion by fastening said free ends of the band body to each other with said center-over type spring of said fastening means operated over said dead center, the L-shaped bent-end portion having a plurality of spikes.

16. An anti-skid device for use with a vehicle wheel having a tire and an annular flanged portion which extends radially outwardly and is concentric with said wheel, said anti-skid device comprising:

a deformable supporting member having a pair of free ends, said deformable supporting member being removably mountable around an annular flanged portion of a wheel;

fastening means for tightly securing said deformable supporting member around said annular flanged portion by fastening said pair of free ends of said supporting member to each other, said supporting member deforming and assuming a generally annular configuration around said annular flanged portion when secured thereto, the supporting member fitting loosely around said annular flanged portion unless said free ends of said supporting member are fastened to each other by said fastening means; and a plurality of elastically deformable anti-skid arms attached to said deformable supporting member, said anti-skid arms extending radially outwardly over an outside one of side walls of a tire when mounted thereon and being angularly spaced apart from each other in a circumferential direction of said tire, each of said anti-skid arms including a bent portion which is elastically deformed and forcedly engaged with a tread surface of said tire when said supporting member is tightly secured around said annular flanged portion by fastening said free ends of said supporting member to each other with said fastening means.

* * * * *